(12) United States Patent
Tejada et al.

(10) Patent No.: US 6,873,467 B1
(45) Date of Patent: Mar. 29, 2005

(54) METHOD AND SYSTEM FOR PROVIDING OPTICAL ALIGNMENT FOR A VISIBLE WAVELENGTH REFLECTIVE SYSTEM

(75) Inventors: John Anthony Tejada, Garland, TX (US); Erwin E. Cooper, Valley View, TX (US); John Paul Schaefer, Plano, TX (US)

(73) Assignee: Raytheon Company, Waltham, MA (US)

( * ) Notice: Subject to any disclaimer, the term of this patent is extended or adjusted under 35 U.S.C. 154(b) by 495 days.

(21) Appl. No.: 09/939,384

(22) Filed: Aug. 24, 2001

(51) Int. Cl.[7] .................................................. G02B 27/10
(52) U.S. Cl. ........................ 359/627; 359/630; 359/633; 359/855
(58) Field of Search ............................... 359/627, 726, 359/630, 631, 633, 855–858, 861; 356/153, 399

(56) References Cited

U.S. PATENT DOCUMENTS

| 5,076,689 A | * | 12/1991 | Adachi ........................ 356/127 |
| 5,257,051 A | * | 10/1993 | Bushroe ....................... 353/122 |
| 5,282,016 A | * | 1/1994 | Shen et al. .................. 356/400 |
| 5,847,879 A | * | 12/1998 | Cook ........................... 359/631 |
| 6,697,200 B2 | * | 2/2004 | Nagaoka ....................... 359/630 |

* cited by examiner

Primary Examiner—Timothy Thompson
Assistant Examiner—M. Hasan
(74) Attorney, Agent, or Firm—Baker Botts L.L.P.

(57) ABSTRACT

A method for providing optical alignment for a visible wavelength reflective system is provided. The method includes positioning a first mirror blank on a lathe fixture. The first mirror blank comprises a single precision pinhole. The first mirror blank is secured to the lathe fixture. A first mirror is generated from the first mirror blank.

29 Claims, 2 Drawing Sheets

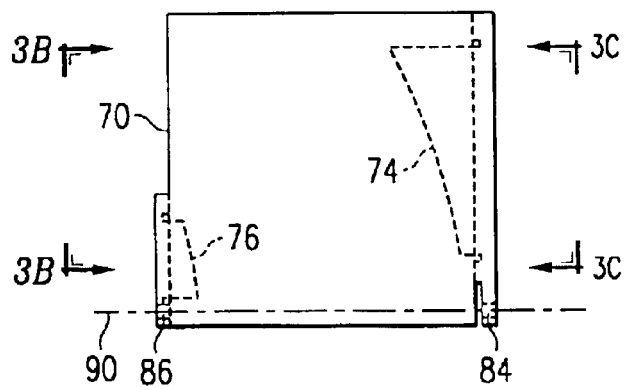
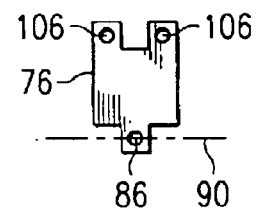
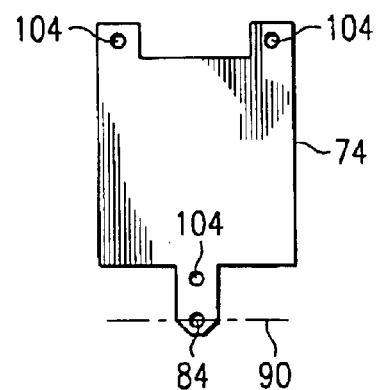
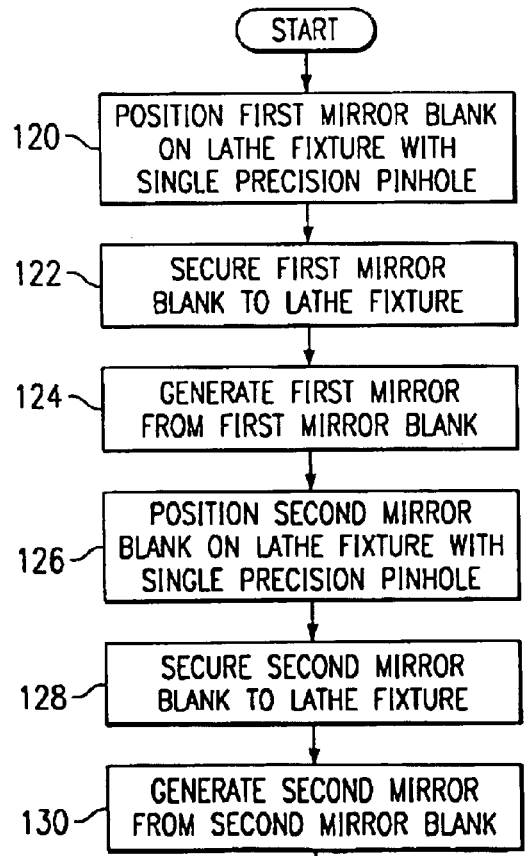
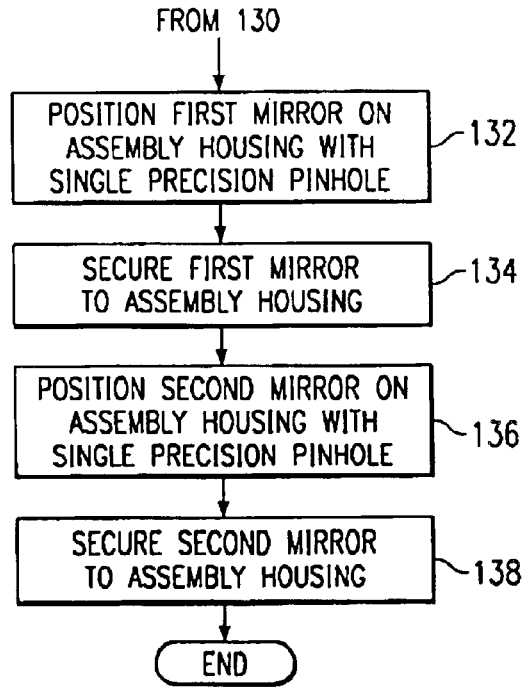

METHOD AND SYSTEM FOR PROVIDING OPTICAL ALIGNMENT FOR A VISIBLE WAVELENGTH REFLECTIVE SYSTEM

GOVERNMENT RIGHTS

This invention was made with Government support under Contract No N00164-99-D-0008-0005 awarded by the department of the Navy. The Government has certain rights in this invention.

TECHNICAL FIELD OF THE INVENTION

This invention relates generally to optical device manufacturing and more particularly to a method and system for providing optical alignment for a visible wavelength reflective system.

BACKGROUND OF THE INVENTION

Night vision devices, such as forward-looking infrared radar, are used to amplify light and allow a user to see images in very dark conditions. Night vision devices typically include a series of mirrors which must be aligned to a specific degree of accuracy in order for the devices to operate properly. A diamond-point turning (DPT) bolt-together method is often used to align these mirrors.

A typical DPT bolt-together method provides a pair of off-axis pins for positioning mirrors relative to an optical axis. This method has traditionally resulted in relatively expensive and tedious assembly alignment due to the adjustment of one or two mirrors in the latter assembly stages in order to achieve optimum wavefront quality. In addition, this method uses highly skilled personnel who understand interferometry, Zernike polynomials, and opto-mechanical principles to make the adjustments. Furthermore, alignment using this method is limited by tolerance stack-ups caused by the mirror-to-lathe fixture positioning and the mirror-to-assembly housing positioning. Thus, for applications requiring a higher degree of alignment accuracy than these tolerance stack-ups allow, the conventional DPT bolt-together methods are unsatisfactory.

SUMMARY OF THE INVENTION

In accordance with the present invention, a method and system for providing optical alignment for a visible wavelength reflective system are provided that substantially eliminate or reduce disadvantages and problems associated with previously developed systems and methods. In particular, a single precision pinhole in a mirror of the system is used for positioning the mirror, which significantly improves alignment accuracy.

In one embodiment of the present invention, a method is provided for providing optical alignment for a visible wavelength reflective system. The method includes positioning a first mirror blank on a lathe fixture. The first mirror blank comprises a single precision pinhole. The first mirror blank is secured to the lathe fixture. A first mirror is generated from the first mirror blank.

In another embodiment of the present invention, a method is provided for providing optical alignment for a visible wavelength reflective system. The method includes positioning a first mirror on an assembly housing. The first mirror comprises a single precision pinhole. The first mirror is secured to the assembly housing. A second mirror is positioned on the assembly housing. The second mirror comprises a single precision pinhole. The second mirror is secured to the assembly housing.

In yet another embodiment of the present invention, a system is provided for providing optical alignment for a visible wavelength reflective system. The system includes a lathe fixture and a mirror blank. The lathe fixture is operable to be received in a lathe. The lathe fixture comprises a single precision pin. The single precision pin is aligned with an optical axis for the lathe when the lathe fixture is received in the lathe. The mirror blank is operable to be secured to the lathe fixture. The mirror blank comprises a single precision pinhole. The single precision pinhole is aligned with the single precision pin.

In still another embodiment of the present invention, an assembly housing for a visible wavelength reflective system is provided that includes a primary mirror and a secondary mirror. The primary mirror comprises a single precision pinhole. The single precision pinhole is aligned with an optical axis of the assembly housing. The secondary mirror comprises a single precision pinhole. The single precision pinhole is aligned with the optical axis of the assembly housing.

Technical advantages of one or more embodiments of the present invention include providing an improved method for providing optical alignment for a visible wavelength reflective system. In a particular embodiment, a single precision pinhole in the primary and secondary mirrors of the system are used for positioning the mirrors relative to the optical axis. As a result, tolerance stack-ups are substantially reduced and alignment accuracy is significantly improved.

Technical advantages of one or more embodiments of the present invention also include decreased assembly and repair times, as well as less-demanding labor skills for assembly and repair. Accordingly, the cost associated with both assembly and repair for the mirrors of the visible wavelength reflective system are reduced.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIGS. 3A–C are block diagrams illustrating a system for providing optical alignment for the visible wavelength reflective system of FIG. 1 in accordance with one embodiment of the present invention; and FIG. 4 is a flow diagram illustrating a method for providing optical alignment for the visible wavelength reflective system of FIG. 1 in accordance with one embodiment of the present invention.

DETAILED DESCRIPTION OF THE INVENTION

Figure 1:
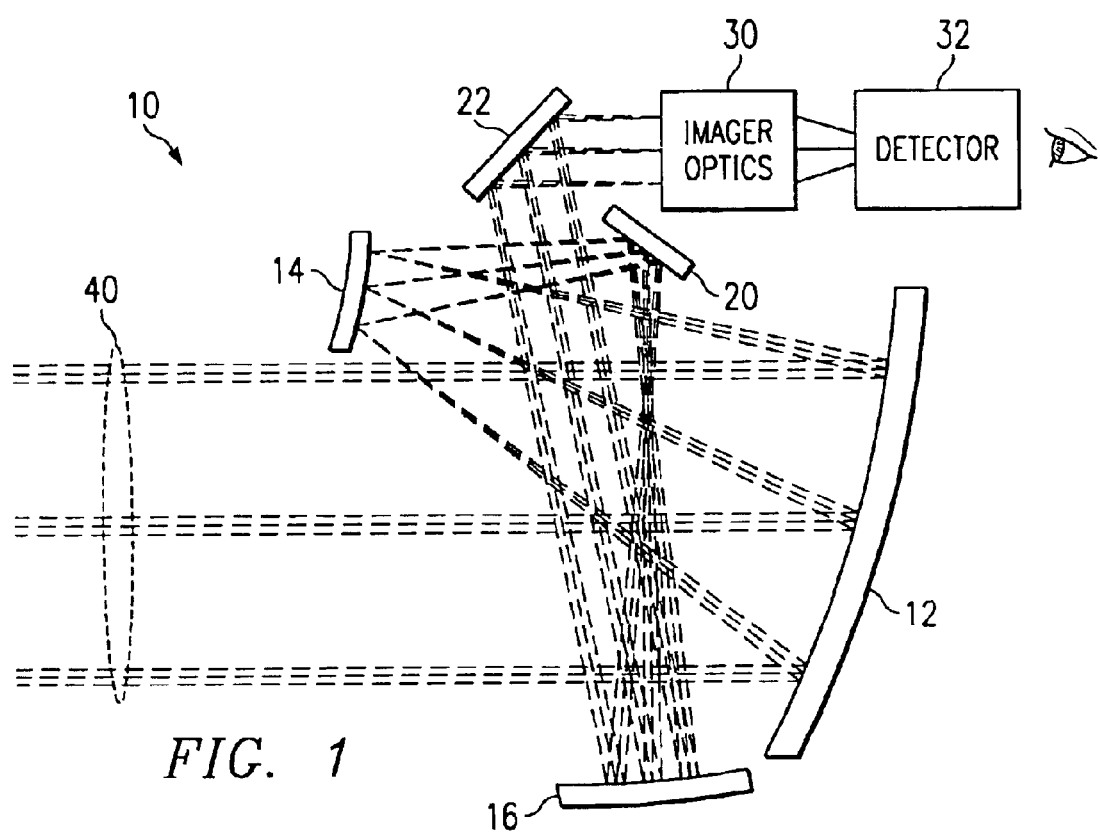
FIG. 1 is a block diagram illustrating a visible wavelength reflective system operable to be optically aligned in accordance with one embodiment of the present invention.

FIG. 1 is a block diagram illustrating a visible wavelength reflective system 10 that is operable to be optically aligned in accordance with one embodiment of the present invention. According to one embodiment, the reflective system 10 comprises a system that is operable to receive radiation emitted from objects under conditions in which the objects may not be visible to the human eye and to generate a viewable image for a user based on the received radiation. For example, the reflective system 10 may comprise a forward-looking infrared radar or other suitable night-vision device that is operable to generate an image of a scene that is not otherwise visible due to a lack of surrounding light. As described in more detail below, however, it will be understood that the reflective system 10 may comprise any suitable optical device in which one mirror is aligned with another mirror.

According to the illustrated embodiment, the reflective system 10 comprises a primary mirror 12, a secondary mirror 14, a tertiary mirror 16, and two fold mirrors 20 and 22. The illustrated reflective system 10 also comprises imager optics 30 and a detector 32. For this embodiment, a stream of radiation 40 that has been emitted from objects which are to be viewed by a user of the reflective system 10 is received in the reflective system 10.

The stream of radiation 40 impinges on the primary mirror 12 and is reflected onto the secondary mirror 14. From the secondary mirror 14, the radiation 40 is reflected onto the fold mirror 20, which in turn reflects the radiation 40 onto the tertiary mirror 16. The tertiary mirror 16 reflects the radiation 40 onto the fold mirror 22, and the fold mirror 22 reflects the radiation 40 toward the imager optics 30.

The imager optics 30 comprises lenses, mirrors and/or other suitable components that are operable to focus the radiation 40 onto the detector 32. The detector 32 comprises any suitable components that are operable to convert the radiation 40 received from the imager optics 30 into a viewable image for the user.

As described in more detail below in connection with FIGS. 2–4, the primary mirror 12 and the secondary mirror 14 are aligned with each other through the use of a single precision pinhole in each mirror 12 and 14 that coincides with the optical axis of the reflective system 10 and of a lathe. This results in the mirror alignment being substantially improved due to the reduction in tolerance stack-up as compared to mirrors aligned through the use of a pair of off-axis pinholes.

Figure 2:
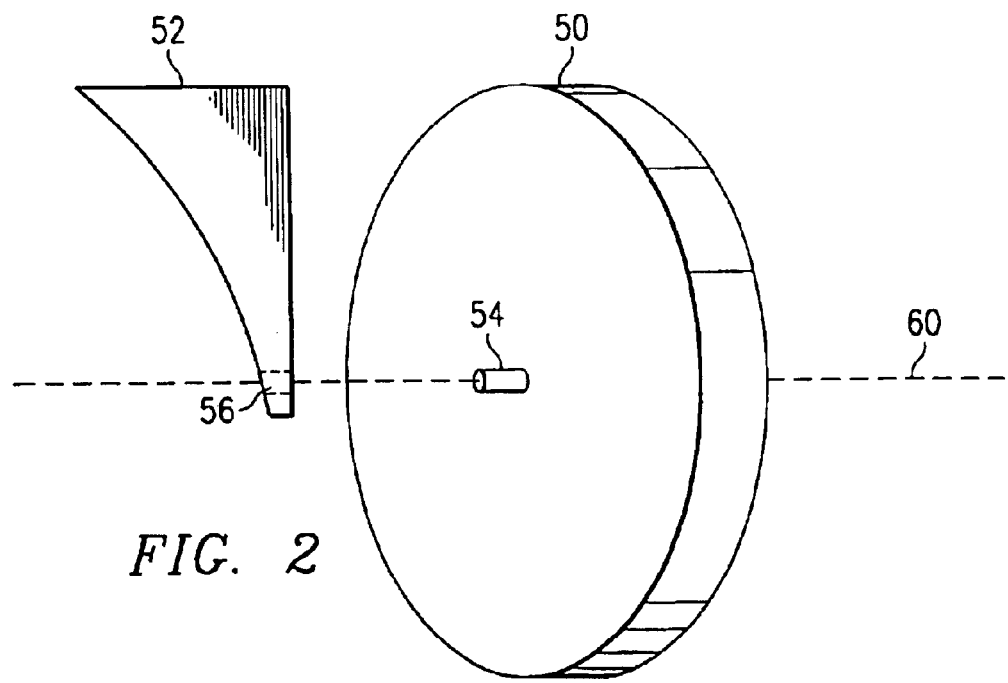
FIG. 2 is a block diagram illustrating a system for generating mirrors operable to be optically aligned for use in the visible wavelength reflective system of FIG. 1 in accordance with one embodiment of the present invention.

FIG. 2 is a block diagram illustrating a system 48 for generating mirrors operable to be optically aligned for use in the visible wavelength reflective system 10 in accordance with one embodiment of the present invention. The system 48 comprises a lathe fixture 50 and a mirror blank 52 which may be secured on the lathe fixture 50. The lathe fixture 50 is operable to be received in a lathe (not shown), which is operable to generate a mirror from the mirror blank 52.

The lathe fixture 50 comprises a pin 54 that is operable to fit through a corresponding pinhole 56 in the mirror blank 52. After being aligned to the lathe fixture 50 through the pinhole 56, the mirror blank 52 may then be secured on the lathe fixture 50 by bolts or other suitable fastening devices through bolt holes (not shown in FIG. 2).

A mirror may then be generated by the lathe through a diamond-point turning bolt-together or other suitable method. The pin 54 is centered in the lathe fixture 50 such that the pin 54 and the pinhole 56 are aligned with the optical axis 60 of the lathe while the mirror is generated from the mirror blank 52. Thus, the resulting mirror may be more accurately aligned with another mirror generated in a similar manner due to the reduction in tolerance stack-up as compared to mirrors generated from mirror blanks that are aligned with a pair of off-axis pinholes.

FIGS. 3A–C are block diagrams illustrating a system for providing optical alignment for the visible wavelength reflective system 10 in accordance with one embodiment of the present invention. The system comprises an assembly housing 70 that is operable to receive at least two mirrors 74 and 76. The mirrors 74 and 76 are operable to be aligned with each other. According to one embodiment, the first mirror 74 performs a similar function to that of the primary mirror 12 of the reflective system 10, and the second mirror 76 performs a similar function to that of the secondary mirror 14 of the reflective system 10.

The first mirror 74 comprises a single precision pinhole 84, and the second mirror 76 comprises a single precision pinhole 86. Each of the pinholes 84 and 86 is aligned with an optical axis 90 for the assembly housing 70. The assembly housing 70 comprises a corresponding pin 94 and 96 for each pinhole 84 and 86. The pins 94 and 96 are operable to fit through their corresponding pinholes 84 and 86 in the mirrors 74 and 76, thereby aligning the mirrors 74 and 76 to the optical axis 90.

After being aligned through the pinholes 84 and 86, the mirrors 74 and 76 may then be secured to the assembly housing 70 by bolts or other suitable fastening devices through bolt holes 104 and 106. Although the illustrated embodiment comprises three bolt holes 104 for the first mirror 74 and two bolt holes 106 for the second mirror 76, it will be understood that each of the mirrors 74 and 76 may comprise any suitable number of bolt holes 104 and 106 without departing from the scope of the present invention.

FIG. 4 is a flow diagram illustrating a method for providing optical alignment for the visible wavelength reflective system 10 in accordance with one embodiment of the present invention. The method begins at step 120 where a first mirror blank 52 comprising a single precision pinhole 56 is positioned on the lathe fixture 50 by fitting the pin 54 of the lathe fixture through the pinhole 56. At step 122, the first mirror blank 52 is secured to the lathe fixture 50. According to one embodiment, the first mirror blank 52 is secured to the lathe fixture 50 with bolts through bolt holes in the first mirror blank 52. At step 124, a first mirror 74 is generated from the first mirror blank 52.

In this way, the first mirror 74 may be generated with a tolerance stack-up associated with the lathe fixture 50 of less than 6.0 microns in a single direction. According to one embodiment, the tolerance stack-up associated with the lathe fixture 50 is approximately 0.5 microns in a single direction.

At step 126, a second mirror blank 52 comprising a single precision pinhole 56 is positioned on the lathe fixture 50 by fitting the pin 54 of the lathe fixture through the pinhole 56. At step 128, the second mirror blank 52 is secured to the lathe fixture 50. According to one embodiment, the second mirror blank 52 is secured to the lathe fixture 50 with bolts through bolt holes in the second mirror blank 52. At step 130, a second mirror 76 is generated from the second mirror blank 52.

In this way, the second mirror 76 may be generated with a tolerance stack-up associated with the lathe fixture 50 of less than 6.0 microns in a single direction. According to one embodiment, the tolerance stack-up associated with the lathe fixture 50 is approximately 0.5 microns in a single direction.

At step 132, the first mirror 74, which comprises a single precision pinhole 84, is positioned on the assembly housing 70 by fitting the pin 94 of the assembly housing 70 through the pinhole 84. At step 134, the first mirror 74 is secured to the assembly housing 70. According to one embodiment, the first mirror 74 is secured to the assembly housing 70 with bolts through bolt holes 104 in the first mirror 74.

In this way, the first mirror 74 may be positioned in the assembly housing 70 with a tolerance stack-up associated with the assembly housing 70 of less than 6.5 microns in a single direction. According to one embodiment, the tolerance stack-up associated with the assembly housing 70 is approximately 2.0 microns in a single direction.

At step 136, the second mirror 76, which comprises a single precision pinhole 86, is positioned on the assembly housing 70 by fitting the pin 96 of the assembly housing 70 through the pinhole 86. At step 138, the second mirror 76 is secured to the assembly housing 70, at which point the method comes to an end. According to one embodiment, the second mirror 76 is secured to the assembly housing 70 with bolts through bolt holes 106 in the second mirror 76.

In this way, the second mirror 76 may be positioned in the assembly housing 70 with a tolerance stack-up associated with the assembly housing 70 of less than 6.5 microns in single direction. According to one embodiment, the tolerance stack-up associated with the assembly housing 70 is approximately 2.0 microns in a single direction.

Accordingly, alignment errors for the mirrors 74 and 76 are minimized, with a total root sum square tolerance stack-up of less than 8.860 microns for the first mirror 74 and a total root sum square tolerance stack-up of less than 7.874 microns for the second mirror 76. According to one embodiment, the total root sum square tolerance stack-up is approximately 2.915 microns for each mirror 74 and 76. In addition, costs for producing the assembly housing 70 may be reduced due to the decreased assembly and repair time and the less-demanding labor skills needed for assembly and repair as compared to an assembly housing produced with off-axis pinhole pairs for positioning the mirrors.

Although the present invention has been described with several embodiments, various changes and modifications may be suggested to one skilled in the art. It is intended that the present invention encompass such changes and modifications as fall within the scope of the appended claims.

What is claimed is:

1. A method for providing optical alignment for a visible wavelength reflective system, comprising:
   positioning a first mirror blank on a lathe fixture, the first mirror blank comprising a single precision pinhole;
   securing the first mirror blank to the lathe fixture;
   generating a first mirror from the first mirror blank; and
   the first mirror comprising a tolerance stack-up associated with the lathe fixture of less than 6.0 microns in a single direction.

2. The method of claim 1, the first mirror comprising a tolerance stack-up associated with the lathe fixture of approximately 0.5 microns in a single direction.

3. The method of claim 1, further comprising:
   positioning a second mirror blank on the lathe fixture, the second mirror blank comprising a single precision pinhole;
   securing the second mirror blank to the lathe fixture; and
   generating a second mirror from the second mirror blank.

4. The method of claim 3, further comprising:
   positioning the first mirror on an assembly housing, the first mirror comprising a single precision pinhole;
   securing the first mirror to the assembly housing;
   positioning the second mirror on the assembly housing, the second mirror comprising a single precision pinhole; and
   securing the second mirror to the assembly housing.

5. The method of claim 4, the first mirror comprising a tolerance stack-up associated with the assembly housing of less than 6.5 microns in a single direction, and the second mirror comprising a tolerance stack-up associated with the assembly housing of less than 6.0 microns in a single direction.

6. The method of claim 4, the first mirror comprising a tolerance stack-up associated with the assembly housing of approximately 2.0 microns in a single direction, and the second mirror comprising a tolerance stack-up associated with the assembly housing of approximately 2.0 microns in a single direction.

7. A method for providing optical alignment for a visible wavelength reflective system, comprising:
   positioning a first mirror blank on a lathe fixture, the first mirror blank comprising a single precision pinhole;
   securing the first mirror blank to the lathe fixture;
   generating a first mirror from the first mirror blank;
   positioning a second mirror blank on the lathe fixture, the second mirror blank comprising a single precision pinhole;
   securing the second mirror blank to the lathe fixture; and
   generating a second mirror from the second mirror blank.

8. The method of claim 7, further comprising:
   positioning the first mirror on an assembly housing, the first mirror comprising a single precision pinhole;
   securing the first mirror to the assembly housing;
   positioning the second mirror on the assembly housing, the second mirror comprising a single precision pinhole; and
   securing the second mirror to the assembly housing.

9. The method of claim 8, the first mirror comprising a tolerance stack-up associated with the assembly housing of less than 6.5 microns in a single direction, and the second mirror comprising a tolerance stack-up associated with the assembly housing of less than 6.0 microns in a single direction.

10. The method of claim 8, the first mirror comprising a tolerance stack-up associated with the assembly housing of approximately 2.0 microns in a single direction, and the second mirror comprising a tolerance stack-up associated with the assembly housing of approximately 2.0 microns in a single direction.

11. A method for providing optical alignment for a visible wavelength reflective system, comprising:
   positioning a first mirror on an assembly housing, the first mirror comprising a single precision pinhole;
   securing the first mirror to the assembly housing;
   positioning a second mirror on the assembly housing, the second mirror comprising a single precision pinhole;
   securing the second mirror to the assembly housing; and
   the first mirror comprising a tolerance stack-up associated with the assembly housing of less than 6.5 microns in a single direction, and the second mirror comprising a tolerance stack-up associated with the assembly housing of less than 6.0 microns in a single direction.

12. The method of claim 11, the first mirror comprising a tolerance stack-up associated with the assembly housing of approximately 2.0 microns in a single direction, and the second mirror comprising a tolerance stack-up associated with the assembly housing of approximately 2.0 microns in a single direction.

13. A system for providing optical alignment for a visible wavelength reflective system, comprising:

a lathe fixture operable to be received in a lathe, the lathe fixture comprising a single precision pin, the single precision pin aligned with an optical axis for the lathe when the lathe fixture is received in the lathe;

a mirror blank operable to be secured to the lathe fixture, the mirror blank comprising a single precision pinhole, the single precision pinhole aligned with the single precision pin; and the mirror blank comprising bolt holes, the mirror blank operable to be secured to the lathe fixture through the bolt holes.

14. The system of claim 13, the lathe operable to generate a mirror from the mirror blank, the mirror comprising a single precision pinhole.

15. The system of claim 14, the mirror comprising a tolerance stack-up associated with the lathe fixture of less than 6.5 microns in a single direction.

16. The system of claim 14, the mirror comprising a tolerance stack-up associated with the lathe fixture of less than 6.0 microns in a single direction.

17. The system of claim 14, the mirror comprising a tolerance stack-up associated with the lathe fixture of approximately 0.5 microns in a single direction.

18. An assembly housing for a visible wavelength reflective system, comprising:

a primary mirror comprising a single precision pinhole, the single precision pinhole aligned with an optical axis of the assembly housing;

a secondary mirror comprising a single precision pinhole, the single precision pinhole aligned with the optical axis of the assembly housing; and the primary mirror comprising a tolerance stack-up associated with the assembly housing of less than 6.5 microns in a single direction, and the secondary mirror comprising a tolerance stack-up associated with the assembly housing of less than 6.0 microns in a single direction.

19. The assembly housing of claim 18, the primary mirror comprising a tolerance stack-up associated with the assembly housing of approximately 2.0 microns in a single direction, and the secondary mirror comprising a tolerance stack-up associated with the assembly housing of approximately 2.0 microns in a single direction.

20. The assembly housing of claim 18, the primary and secondary mirrors each comprising bolt holes, the primary and secondary mirrors operable to be secured to the assembly housing through the bolt holes.

21. A system for providing optical alignment for a visible wavelength reflective system, comprising:

a lathe fixture operable to be received in a lathe, the lathe fixture comprising a single precision pin, the single precision pin aligned with an optical axis for the lathe when the lathe fixture is received in the lathe;

a mirror blank operable to be secured to the lathe fixture, the mirror blank comprising a single precision pinhole, the single precision pinhole aligned with the single precision pin; and the lathe operable to generate a mirror from the mirror blank, the mirror comprising a single precision pinhole.

22. The system of claim 21, the mirror comprising a tolerance stack-up associated with the lathe fixture of less than 6.5 microns in a single direction.

23. The system of claim 21, the mirror comprising a tolerance stack-up associated with the lathe fixture of less than 6.0 microns in a single direction.

24. The system of claim 21, the mirror comprising a tolerance stack-up associated with the lathe fixture of approximately 0.5 microns in a single direction.

25. A method for providing optical alignment for a visible wavelength reflective system, including comprising a first and second mirror comprising:

positioning the first mirror on an assembly housing, the first mirror formed with a first precision pinhole;

securing the first mirror to the assembly housing through the first precision pinhole;

positioning the second mirror on the assembly housing, the second mirror formed with a second precision pinhole;

securing the second mirror to the assembly housing through the second precision pinhole; and wherein the first precision pinhole and the second precision pinhole lie along the optical axis of the reflective system.

26. A method for providing optical alignment for a visible wavelength reflective system, comprising:

positioning a first mirror blank on a lathe fixture having an axis of rotation, the first mirror blank comprising a single precision pinhole aligned with an axis of rotation of the lathe;

securing the first mirror blank to the lathe fixture;

generating a first mirror from the first mirror blank;

positioning a second mirror blank on the lathe fixture, the second mirror blank comprising a single precision pinhole aligned with the axis of rotation of the lathe;

securing the second mirror blank to the lathe fixture; and generating a second mirror from the second mirror blank.

27. A method for providing optical alignment for a visible wavelength reflective system, comprising:

positioning a first mirror on an assembly housing, the first mirror comprising a single precision pinhole;

securing the first mirror to the assembly housing;

positioning a second mirror on the assembly housing, the second mirror comprising a precision pinhole;

securing the second mirror to the assembly housing; and wherein the precision pinholes in the first and second mirrors are aligned along an optical axis of the reflective system.

28. A system for providing optical alignment for a visible wavelength reflective system, comprising:

a lathe fixture operable to be received in a lathe, the lathe fixture comprising a single precision pin, the single precision pin aligned with an optical axis for the lathe when the lathe fixture is received in the lathe; and a mirror blank operable to be secured to the lathe fixture, the mirror blank comprising a single precision pinhole, the single precision pinhole aligned with the single precision pin.

29. An assembly housing for a visible wavelength reflective system, comprising:

a primary mirror comprising a single precision pinhole, the single precision, pinhole aligned with an optical axis of the assembly housing; and a secondary mirror comprising a single precision pinhole, the single precision pinhole aligned with the optical axis of the assembly housing.

* * * * *